Patented Dec. 4, 1951

2,577,618

UNITED STATES PATENT OFFICE 2,577,618

RUBBERLIKE CURED POLYESTERS CONTAINING CALCIUM SILICATE AND PROCESS OF PRODUCING SAME

David W. Jayne, Jr., Old Greenwich, and Harold M. Day, Cos Cob, Conn., assignors to American Cyanamid Company, New York, N. Y., a corporation of Maine No Drawing. Application December 18, 1946, Serial No. 717,092

2 Claims. (Cl. 260—40)

This invention relates to high molecular weight polyesters and more specifically, to improved co-condensation products of linear polyesters with polyfunctional compounds.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

It is an object of the present invention to prepare rubber-like resinous products having improved properties.

It is another object of the present invention to prepare a rubber-like product of excellent resilience, tensile strength and elongation.

These and other objects are attained by bringing about reaction between substantially equivalent proportions of a glycol and a saturated aliphatic dicarboxylic acid which does not form an anhydride upon heating in the presence of small quantities of an alpha,beta-unsaturated aliphatic dicarboxylic acid and a polyfunctional compound which is a polyamine, an aliphatic amino alcohol or a polyhydric alcohol in which the total number of hydroxyl groups, amino groups or hydroxyl and amino groups is at least 3, compounding the resulting resinous reaction product with a filler comprising calcium silicate, and curing the compounded product by heating in the presence of an organic peroxide catalyst.

The invention will be described in greater detail in conjunction with the following specific examples in which the proportions are given in parts by weight. It should be understood that the examples are merely illustrative, and it is not intended that the scope of the invention be limited to the details therein set forth.

EXAMPLE 1

Part A 100 parts of resin "A."
64 parts of magnesium carbonate (rubber grade).
2 parts of lauroyl peroxide.

The resin and magnesium carbonate filler are milled on a rubber mill until the latter is thoroughly dispersed. The lauroyl peroxide is added to the stock, and milling is continued until the peroxide curing agent is also thoroughly dispersed in the resin. Cold water is passed through the rolls of the mill during the entire operation.

The stock is removed from the milling rolls as a sheet by means of a doctor blade, and the sheet is cured in a stainless steel flash mold for 10 minutes at 500 p. s. i. pressure at 110° C.

The cured sheet has a tensile strength of 900 p. s. i. and an elongation at break of 370%.

Part B 100 parts of resin "B."
64 parts of magnesium carbonate (rubber grade).
2 parts of lauroyl peroxide.

The procedure of part A is followed and the cured sheet obtained found to have a tensile strength of 800 p. s. i. and an elongation at break of 270%.

Part C

Part A is repeated except that in place of the 64 parts of magnesium carbonate, a mixture of 50 parts of magnesium carbonate and 10 parts of calcium silicate (rubber grade) is used. The tensile strength of the cured product so obtained is 1350 p. s. i. and the product has an elongation at break of 330%.

EXAMPLE 2

Part A 100 parts of resin "C."
150 parts of Mapico Red No. 297 (Binney and Smith iron oxide).
2 parts of lauroyl peroxide.

The procedure of Example 1, part A, is followed and a cured product having a tensile strength of 875 p. s. i. and a 330% elongation at break is obtained.

Part B

The procedure of part A is repeated using a mixture of 40 parts calcium carbonate and 20 parts calcium silicate in place of the Mapico Red No. 297. The cured product obtained has a tensile strength of 850 p. s. i. and a 380% elongation at break.

Part C

The procedure of part A is repeated using a mixture of 50 parts calcium carbonate and 10 parts calcium silicate in place of the Mapico Red No. 297. The cured sheet obtained has a tensile strength of 700 p. s. i. and a 480% elongation at break.

Part D

The procedure of part A is repeated using 70 parts of calcium carbonate in place of the Mapico Red No. 297. The cured sheet obtained has a tensile strength of 650 p. s. i. and a per cent elongation at break of 520%.

Part E

The procedure of part A is repeated except that a mixture containing 50 parts of magnesium carbonate and 10 parts of calcium silicate is substituted for the Mapico Red No. 297. The cured product obtained has a tensile strength of 1310 p. s. i. and a 400% elongation at break.

Part F

The procedure of part A is repeated using a mixture of 40 parts magnesium carbonate and 20 parts calcium silicate in place of the Mapico Red No. 297. The cured product obtained has a tensile strength of 1420 p. s. i. and a 420% elongation at break.

Part G

The procedure of part A is repeated using a mixture of 20 parts magnesium carbonate and 40 parts calcium silicate in place of Mapico Red No. 297. The cured product obtained has a tensile strength of 1350 p. s. i. and an elongation at break of 420%.

Part H

The procedure of part A is repeated using 40 parts of calcium silicate in place of the Mapico Red No. 297. The cured sheet obtained has a tensile strength of 1400 p. s. i. and a per cent elongation at break of 370%.

Part I

The procedure of part A is followed using 60 parts of calcium silicate in place of the Mapico Red No. 297. The cured sheet obtained has a tensile strength of 1600 p. s. i. and a per cent elongation at break of 470.

EXAMPLE 3

Part A 100 parts of resin "D."
60 parts of talc.
2 parts of lauroyl peroxide.

The procedure of Example 1, part A, is followed and a cured product which has a tensile strength of 200 p. s. i. and an elongation at break of 300% is obtained.

Part B

The procedure of part A is repeated using a mixture of 40 parts magnesium carbonate and 20 parts calcium silicate. The cured product obtained has a tensile strength of 1750 p. s. i. and a 340% elongation at break.

Part C

The procedure of part A is repeated using a mixture containing 20 parts magnesium carbonate and 40 parts calcium silicate. The cured product which results has a tensile strength of 1500 p. s. i. and a per cent elongation of 350.

EXAMPLE 4

100 parts of resin "E."
50 parts of magnesium carbonate (rubber grade).
10 parts of calcium silicate (rubber grade).
2 parts of lauroyl peroxide.

The procedure of Example 1, part A, is followed and the cured product obtained has a tensile strength of 1200 p. s. i., an elongation at break of 480%, a brittle point of −42° C., a Shore hardness of 68 and an ASTM tear resistance of 19.7 lbs./0.1 inch thickness.

EXAMPLE 5

500 parts of resin "F."
250 parts of magnesium carbonate (rubber grade).
50 parts of calcium silicate (rubber grade).
10 parts of carbon black.
10 parts of lauroyl peroxide.

The ingredients are milled on a water-cooled, slow-speed, rubber mill until a homogeneous dispersion is obtained. The milled stock is then cured at 110° C. for 10 minutes under 500 lbs./in.$^2$ pressure, and a cured sheet so obtained is found to have the following properties:

| Tensile Strength, p. s. i. | Per cent at Elongation |
|---|---|
| 240 | 100 |
| 290 | 200 |
| 320 | 300 |
| 440 | 400 |
| 750 | 500 |
| 1,250 | 590 (break) |

In addition, the product has a resilience of 34% and an ASTM tear resistance of 12.5 lbs./0.1 inch thickness. It is resistant to dry heat, boiling water, steam at 15 pounds pressure, 20% sulfuric acid, 10% acetic acid, 10% soda ash solution, ethyl alcohol and gasoline.

Preparation of Resin "A"

188 parts of azelaic acid (1.0 mol).
5 parts of maleic anhydride (0.05 mol).
34 parts of ethylene glycol (0.55 mol).
53 parts of diethylene glycol (0.50 mol).
3 parts of glycerol (0.03 mol).
2 parts of zinc chloride.

All of the above-listed ingredients are charged into a three-neck vessel filled with a mechanical agitator. The charge is heated by means of an oil bath to 175° C. in one-half hour, held at this temperature for one-half hour, and then heated at 200° C. for one hour. The heating is carried out under atmospheric pressure with continuous agitation by means of a stream of carbon dioxide gas which aids in the removal of water and protects the reaction mixture from air.

The batch is then heated under reduced pressure (about 10 mm. Hg) for 3 hours and poured into a container in which it is cooled out of contact with air.

Preparation of Resin "B"

106 parts of pimelic acid (0.66 mol).
3 parts of maleic anhydride (0.03 mol).
22 parts of ethylene glycol (0.35 mol).
36 parts of diethylene glycol (0.34 mol).
1.5 parts of glycerol (0.02 mol).
1 part of zinc chloride.

The procedure for the preparation of resin "A" is followed except that the ingredients are heated under reduced pressure for 2 hours instead of 3.

Preparation of resin "C"

415 parts of adipic acid (2.8 mols).
15 parts of maleic anhydride (0.15 mol).
100 parts of ethylene glycol (1.6 mols).
159 parts of diethylene glycol (1.5 mols).
7 parts of glycerol (0.08 mol).
3 parts of zinc chloride.

The procedure for the preparation of resin "A" is followed except that the ingredients are heated for only 1½ hours under vacuum.

Preparation of resin "D"

415 parts of adipic acid (2.8 mols).

15 parts of maleic anhydride (0.15 mol).
100 parts of ethylene glycol (1.6 mols).
159 parts of diethylene glycol (1.5 mols).
7 parts of glycerol (0.08 mol).
3 parts of zinc chloride.

The procedure followed for the preparation of resin "A" is repeated except that the ingredients are heated for only one hour under vacuum.

*Preparation of resin "E"*

427 parts of adipic acid (2.9 mols).
7 parts of maleic anhydride (0.07 mol).
100 parts of ethylene glycol (1.6 mols).
159 parts of diethylene glycol (1.5 mols).
7 parts of glycerol (0.08 mol).
3 parts of zinc chloride.

The ingredients are charged into a closed stainless steel kettle fitted with an agitator and a distilling condenser. The charge is heated with agitation to 210° C. and held at this temperature for about 2 hours under atmospheric pressure. During this heating period a small stream of carbon dioxide is bubbled through the mix. The charge is then heated with continued agitation at 210° C. under reduced pressure (about 20 mm.) for an additional 2 hours. The resulting viscous resin is then discharged into suitable containers and cooled to form a clear, amber-colored, tough, elastic resin.

*Preparation of resin "F"*

77.5 parts of adipic acid (0.53 mol).
1.3 parts of maleic anhydride (0.013 mol).
18.2 parts of ethylene glycol (0.3 mol).
28.9 parts of diethylene glycol (0.27 mol).
1.2 parts of glycerol (0.013 mol).
0.5 part of zinc chloride.

The procedure for the preparation of resin "E" is followed and a clear, amber-colored, tough, elastic resin is obtained.

In order that the improved properties of the products of the present invention may be readily apparent, the data of the examples is summarized in the following table in which the filler combinations which come within the scope of the present invention are indicated by means of an asterisk placed at the extreme right of the last column of the table.

TABLE

| Example | Resin | Filler parts/100 parts resin | Tensile Strength, p. s. i. | Per Cent Elongation at break |
|---|---|---|---|---|
| 1A | A | 64 magnesium carbonate | 900 | 370 |
| 1B | B | ---do--- | 800 | 270 |
| 1C | A | 50 magnesium carbonate 10 calcium silicate | 1,350 | 330* |
| 2A | C | 150 Mapico Red No. 297 | 875 | 330 |
| 2B | C | 40 calcium carbonate 20 calcium silicate | 850 | 380 |
| 2C | C | 50 calcium carbonate 10 calcium silicate | 700 | 480 |
| 2D | C | 70 calcium carbonate | 650 | 520 |
| 2E | C | 50 magnesium carbonate 10 calcium silicate | 1,310 | 400* |
| 2F | C | 40 magnesium carbonate 20 calcium silicate | 1,420 | 420* |
| 2G | C | 20 magnesium carbonate 40 calcium silicate | 1,350 | 420* |
| 2H | C | ---do--- | 1,400 | 370* |
| 2I | C | 60 calcium silicate | 1,600 | 470* |
| 3A | D | 60 talc | 200 | 300 |
| 3B | D | 40 magnesium carbonate 20 magnesium carbonate | 1,750 | 340* |
| 3C | D | 40 calcium silicate | 1,500 | 350* |
| 4 | E | 50 magnesium carbonate 10 calcium silicate | 1,200 | 480* |
| 5 | F | 50 magnesium carbonate 10 calcium silicate | 1,250 | 590* |

In order to obtain products of superior characteristics according to the present invention, however, it is essential that the proportion of calcium silicate used be carefully controlled. We have found that very definite limits exist and if these limits are not recognized the specific reinforcing action of the calcium silicate filler on the polyester composition is not realized. The filler may be either calcium silicate alone, a mixture of calcium silicate and magnesium carbonate containing at least about 15% by weight of calcium silicate, or a mixture of calcium silicate and a filler other than magnesium carbonate containing at least about 50% by weight of calcium silicate.

Magnesium carbonate appears to have a cooperative effect with the calcium silicate and extremely high tensile strengths, comparable to those of products containing calcium silicate alone, are obtained when mixtures of calcium silicate and magnesium carbonate containing as little as about 15% calcium silicate are used. The elongations at break of the mixtures are not quite as high as those of compositions filled with calcium silicate alone. However, the products obtained using mixtures of calcium silicate and magnesium carbonate within the limits defined are not as stiff as those obtained when calcium silicate alone is used and for many applications are consequently superior.

Other fillers than magnesium carbonate do not appear to improve the strength, etc., of products filled with calcium silicate but if present in a minor proportion with the calcium silicate, they do no harm.

Saturated aliphatic dicarboxylic acids which may be used in the present invention are those having at least four carbon atoms between the two carboxyl groups. Examples of suitable acids are adipic acid, azelaic acid, sebacic acid, pimelic acid, brassylic acid, suberic acid, etc.

Glycols which are suitable for condensation with the saturated aliphatic dicarboxylic acids include ethylene glycol, diethylene glycol, triethylene glycol, propylene glycol, dipropylene glycol, butylene glycol, hexamethylene glycol, etc. Mixtures of two or more different glycols may be used, as evidenced by the foregoing examples and, in fact, we have found that an equimolar mixture of ethylene glycol and diethylene glycol is most satisfactory. If all ethylene glycol, for example, is used, a stiff leather-like product results whereas the use of all diethylene glycol results in the production of a soft product which is somewhat hard to mill. Use of the mixture of the two glycols results in a polyester of superior properties.

Suitable polyfunctional compounds, those having at least three hydroxyl or amino or hydroxyl and amino groups, may be selected from the groups of aliphatic amino alcohols, polyhydric alcohols and polyamines. Examples of some of these polyfunctional compounds are diethanolamine, the dipropanolamines, the dibutanolamines, hydroxyethylethylene diamine, trimethylol aminomethane, N-hydroxyethyl diethylenetriamine, triethylene tetramine, tetraethylene pentamine, di-n-propylene triamine, glycerol, pentaerythritol, dipentaerythritol, etc.

Alpha,beta-unsaturated aliphatic acids which may be used in the formulation of the polyesters of the present invention include maleic acid, fumaric acid, itaconic acid, citraconic acid and anhydrides thereof.

The resins of the present invention are prepared by heating the ingredients at temperatures between about 180° and 220° C. and preferably at about 200° C. The reaction is advantageously carried out under reduced pressure. If desired, the reactants may be heated under atmospheric pressure for a time and then for a period under reduced pressures or the entire reaction may be carried out at atmospheric or the entire reaction may be carried out under reduced pressure. The time of reaction will, of course, depend on which alternative is selected, along with other factors such as the particular reactants involved, the size of the reaction batch, the amount of heat transfer, etc.

The resin obtained upon reaction of saturated aliphatic dicarboxylic acid, glycol, polyfunctional compound and alpha,beta-unsaturated dicarbolylic acid according to the process of the present invention can be cured by heating with a small amount of an organic peroxide. The resin is milled on a rubber mill with a calcium silicate filler and a peroxide curing agent and then cured under heat and pressure in a rubber hold to yield a strong and elastic rubber-like product. Since the resins cure rapidly at relatively low temperatures and therefore have a tendency to cure prematurely during milling or to scorch on the mill, it is desirable to utilize cooling water in the milling rolls.

The milled stock may be cured in a rubber-mold at 90°-120° C. and in 5-15 minutes at 500-1000 pounds pressure.

Examples of suitable curing catalysts include the acidic peroxides, for example phthalic peroxide, benzoyl peroxide, succinic peroxide, benzoyl acetic peroxide; the fatty oil acid peroxides, for example, coconut oil acid peroxide, lauric peroxide, stearic peroxide; the alkyl peroxides, for example, tertiary butyl hydroperoxide; and the terpene peroxides, for example, ascaridole, etc. In general, the concentration of catalyst should be from about 1% to about 10% by weight of the resin.

It may be desirable to add a polymerization inhibitor to the resins of the present invention during their preparation to stabilize them and to minimize the amount of scorching on the mill. Suitable inhibitors are, for example, hydroquinone, benzaldehyde, resorcinol, tannin, formaldehyde, sym. alpha,beta-naphthyl-p-phenylene diamine, ascorbic acid, isoascorbic acid, etc., in an amount equivalent to about 0.1% to 1% by weight of the total weight of reaction mixture.

It is preferable that the total acid and alcohol components be employed in approximately stoichiometrically equivalent proportions, but a slight excess of one of the reactants does not necessarily do any harm. We prefer that the polyfunctional compound be present in a quantity equal to about 2½ mol per cent of the saturated dicarboxylic acid plus alpha,beta-unsaturated acid content and that the alpha,beta-unsaturated acid be present in a quantity equal to about 2½ mol per cent of the saturated dicarboxylic acid content. However, the present invention is not limited to these preferred proportions and, in general, the indicated mol per cent of the polyfunctional compound may vary from about 2% to about 3.5% and that of the alpha,beta-unsaturated acid, from about 2% to about 6%.

It is an advantage of the present invention that the rubber-like products obtained in accordance therewith have much more resilience and considerably greater tensile strength and elongation than have similar products obtained by curing polyesters which have been compounded with fillers other than those comprising calcium silicate. Reference to the table immediately following the specific examples makes it readily apparent that magnesium carbonate, calcium carbonate, talc and iron oxide, for example, give products with inferior properties. Other fillers such as clay, carbon black, etc., while not appearing in the specific examples or on the chart also give products of inferior strength. Suitable products can, however, be obtained by replacing a minor proportion of the calcium silicate with any of the above enumerated fillers although they are not satisfactory when used alone. Thus, a mixture of calcium silicate and calcium carbonate, for example in a 45%-55% ratio, may be used and the desired improved characteristics of the product realized.

The materials of the present invention closely resemble rubber, lacking its resilience and high tensile strength and elongation but they are superior to natural rubber in their gasoline, grease and oil resistance, their resistance to deterioration by actinic light, heat and/or air, and their relatively short time of cure. These and other properties put our new rubber-like products in the class of a specialty product. As such, they have many uses as substitutes for rubber in more or less static applications. Some of these include the fabrication of jar rings, shoe soles and heels, gaskets, special tubing, printing and typewriter rolls, etc. In addition, they find application in many industrial fields including laminating, coating, impregnating, etc. For example, the products of the present invention, before curing, may be used as textile or fabric impregnants to produce, after curing of the impregnated material, water-repellant products.

The resins of the present invention may be mixed with rubber whereupon they act not only as anti-oxidants, plasticizers and a means of lowering both the viscosity and the power required during milling, but also as vulcanization accelerators. They may be mixed with ester gum and various alkyd resins, particularly the oil-modified air-drying resins to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, either in solution or by admixture as solid resins.

Obviously, suitable dyes and pigments may be mixed with the filled resins of the present invention to modify their properties as may be desirable. Some suitable pigments include iron oxides, carbon black, titanium dioxide, silicon dioxide, etc., as well as other pigments which are of suitable size to act as reinforcing pigments. Due to absorption of peroxide by carbon black, it is usually preferably used in admixture with other pigments.

When used in the present specification and claims, the term "rubber-like" is intended to cover products which may vary rather widely in appearance from rubbery to leathery but which have in common the following properties: the products are essentially thermoset and cross-linked chemically, their tensile strengths are increased by pigmenting, they cannot be readily reprocessed as by calendering or remolding after they have become thermoset, and they can be cured by heating in the presence of an organic peroxide catalyst.

We claim:

1. A process of preparing a rubber-like resinous product which comprises heating substantially equivalent proportions of a saturated aliphatic dicarboxylic acid having at least four carbon atoms between the two carboxyl groups and a substantially equimolar mixture of ethylene glycol and diethylene glycol in the presence of from 2 to 6 mol percent, based on the saturated dicarboxylic acid content of an alpha, beta unsaturated aliphatic hydrocarbon dicarboxylic acid and from 2 to 3.5 mol percent, based on the saturated dicarboxylic acid content plus the alpha, beta unsaturated acid content, of a polyhydric alcohol containing at least three hydroxyl groups, blending the resinous reaction obtained with an organic peroxide curing catalyst and an inert filler, said filler being selected from the group consisting of (1) calcium silicate, (2) a mixture consisting of calcium silicate and magnesium carbonate, at least about 15% by weight of said mixture being calcium silicate, and (3) a mixture consisting of calcium silicate and a filler other than magnesium carbonate, at least 50% by weight of said mixture being calcium silicate, and curing the blended resinous reaction product by heating.

2. A rubber-like resinous product obtained by the process of claim 1.

DAVID W. JAYNE, Jr.
HAROLD M. DAY.

REFERENCES CITED

The following references are of record in the file of this patent:

UNITED STATES PATENTS

| Number | Name | Date |
|---|---|---|
| 2,263,606 | Balassa | Nov. 25, 1941 |
| 2,363,581 | Frosch | Nov. 28, 1944 |
| 2,367,629 | Teppema et al. | Jan. 16, 1945 |

OTHER REFERENCES

"Silene," Standard Chemical Company, Akron, Ohio, March 12, 1943 (pages 5, 6, 30 and 32).